3,496,021
FUEL CELL COMPRISING A FORAMINOUS ELECTRODE CONSISTING ESSENTIALLY OF NICKEL MANGANESE ALLOY
James F. Haefling, Richardson, Tex., assignor to Texas Instruments Incorporated, Dallas, Tex., a corporation of Delaware
Filed Mar. 4, 1966, Ser. No. 531,882
Int. Cl. H01m 27/04
U.S. Cl. 136—86                                       1 Claim

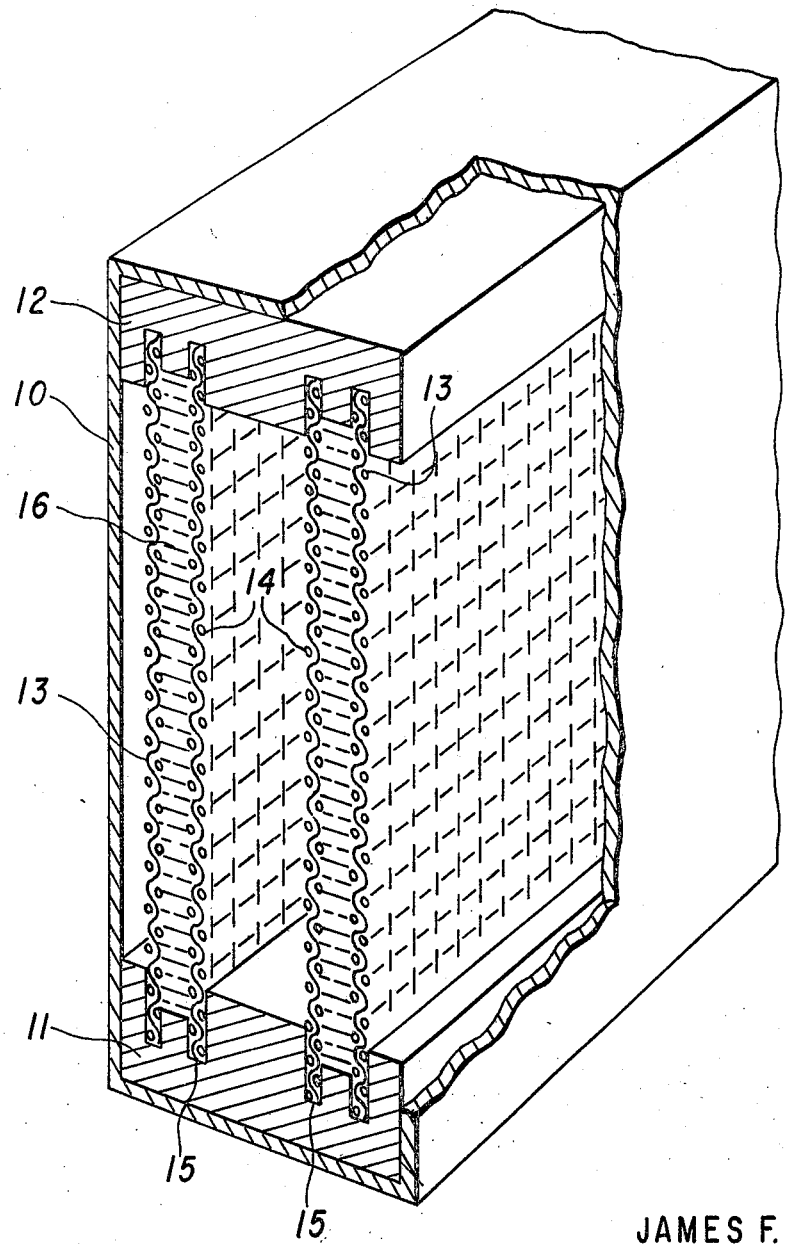

ABSTRACT OF THE DISCLOSURE

A fuel cell including a foraminous thin sheet electrode of an alloy consisting essentially of 90 percent by weight nickel and 10 percent by weight manganese and a molten alkali carbonate electrolyte.

---

This invention relates to fuel cell electrodes and particularly to a composition of matter which may be used as both the cathode and anode in fuel cells or in other highly corrosive environments.

Fuel cells are devices which convert chemical energy directly into electrical energy. Such devices usually have a fuel electrode (anode) and an oxidant electrode (cathode) which are spaced apart from each other and separated by an electrolyte which is in contact with both. Fuel cells which utilize common hydrocarbon fuels generally operate at a temperature of about 500–600° C. and use a molten alkali carbonate for the electrolyte. The electrodes are generally thin foraminous plates such as wire screens or perforated membranes. The material of the electrode must be capable of withstanding temperatures up to 600° C. It must also withstand the corrosive attack of molten inorganic electrolytes at these temperatures. Furthermore, the fuel electrode is constantly in contact with a reducing atmosphere, while the cathode is in contact with an oxidizing atmosphere. The electrodes must not only withstand this corrosive environment but must remain structurally rigid at the temperatures involved. The electrodes must also provide an active surface which promotes the desired electrochemical reactions.

In the past, materials which satisfied certain of these requirements, such as temperature stability or resistance to the corrosive attack of molten alkali carbonates, were not resistant to strong oxidizing or reducing atmospheres or failed to provide the desired electrochemically active surface. Conversely, materials which provided the desired active surface for the oxidant electrode often failed to provide the desired active surface for the fuel electrode or vice versa. To overcome this problem, cathodes and anodes are generally fabricated from different materials such as silver and nickel, respectively, which are expensive and, in the case of silver, too soft for satisfactory use on fuel cells. For example, silver may be used for the oxidant electrode, but is too expensive and too soft to use in pure metal form. Furthermore, silver tends to migrate, thus blocking pores in the electrode and some times shorting the cell.

Stainless steel and nickel are structurally rigid enough for use as both electrodes, but stainless steel corrodes in the reducing environment of the fuel electrode, and pure nickel corrodes in the oxidizing environment of the cathodes to form a film on the surface of the cathode which inhibits its electrochemical activity.

It is therefore an object of this invention to provide a material for fuel cell electrodes. Another object is to provide a material which will remain structurally rigid at temperatures up to above 600° C. while in contact with highly corrosive atmospheres. A further object is to provide an inexpensive material which may be used as both cathode and anode in a molten carbonate fuel cell.

A particular feature of the material of this invention is its ability to withstand both strong oxidizing and reducing environments at temperatures above 600° C. and provide an electrochemically active surface which promotes both cathode and anode reactions.

These and other objects, features and advantages of the invention will become more readily understood from the following detailed description when read in conjunction with the appended claims and attached drawing in which the sole figure is an elevational view partially in section of a molten carbonate fuel cell utilizing the electrodes of this invention.

In accordance with the invention an alloy comprising approximately 90 percent by weight nickel and approximately 10 percent by weight manganese is provided from which foraminous fuel cell electrodes may be fabricated. The alloy of this invention may be utilized either in wire mesh or thin perforated sheet form, or any other suitable form to provide a thin foraminous electrode. Alternatively, an alloy or powdered mixture of the above proportions can be flame-sprayed by methods well known in the art to provide thin porous layers of the alloy which are suitable for use as fuel cell electrodes.

Referring now to the drawing, a fuel cell utilizing the electrodes of this invention is shown therein. The cell comprises a housing 10 which contains a pair of channeled spacing members 11 and 12. Each spacing member has one or more channels 15 along one surface thereof and the channeled surfaces of a pair of spacing members are opposed and spaced apart. A pair of foraminous electrodes 13 and 14 within the channels are securely positioned and spaced parallel to each other by the channels 15. Molten inorganic electrolyte 16, such as a mixture of sodium carbonate and lithium carbonate, or a slurry of molten electrolyte saturated with powdered magnesia, is contained between the electrodes. The fuel cell is typically operated at temperatures of about 500°–600° C.

In the embodiment shown, the inner electrodes 14 are the fuel electrodes and the outer electrodes 13 are the oxidant electrodes. In operation, air and carbon dioxide are passed between the oxidant electrodes 13 and the housing 10. A hydrogen-containing gas is passed between the fuel electrodes 14.

At the surface of the anode 14 hydrogen fuel reacts with the alkali carbonate electrolyte to produce $H_2O$ and electrical current. Likewise, oxygen and carbon dioxide react with the alkali carbonate at the oxidant electrode 13. These reactions are surface promoted; thus, the efficiency of the fuel cell is dependent on surface area and activity of the electrodes at the fuel-electrolyte and oxidant-electrolyte interfaces.

The NiMn alloy of this invention satisfies the requirements for both anode and cathode. The alloy is not corroded at temperatures up to above 600° C. in oxidizing atmospheres and withstands reducing atmospheres at temperatures up to 700° C. without appreciable corrosion. The alloy is rigid at 700° C. and easily fabricated into electrodes. It is ductile enough to be drawn into wires and malleable enough to be rolled into thin sheets. The alloy may be used in wire screen or perforated sheet form. Both electrodes can be fabricated from the same alloy, thus eliminating separate processes for making anodes and cathodes.

Screens made from the NiMn alloy have been exposed to both strong oxidizing and strong reducing atmospheres at 600° C. for periods up to five weeks. No evidence of corrosion was observed under any of these conditions.

The alloy may be rolled into thin non-self-supporting foils and sintered to a porous electrolyte-supporting medium such as a magnesia disc in accordance with methods well known in the fuel cell art. The alloy can also be applied in powdered form and then sintered to the magnesia, or can be flame-sprayed onto the porous ceramic. It may also be used in composite electrode structures as, for example, sintered onto a thin layer of nickel or stainless steel.

The surface activity of the NiMn alloy is sufficient to promote electrochemical reactions at both the anode and cathode. Furthermore, the alloy is readily wet by inorganic salt electrolytes such as sodium carbonate and lithium carbonate or mixtures thereof. If desired, reaction promoters, catalysts, or additional wetting agents can be plated or sprayed on the alloy of this invention to further enhance surface activity or wetting.

The alloy is preferably made by mixing measured amounts of about 90 percent by weight nickel and about 10 percent by weight manganese in an oxygen-free environment at about 1500° C. until the manganese is completely dissolved in the nickel. The resulting alloy ingot can then be rolled or drawn into the desired shape for fabricating electrodes. The electrode may then be coated with reaction promoters or catalysts, if desired, by plating, flame-spraying, or sintering the desired material, such as silver, on the surface of the NiMn electrode.

Although the alloy of this invention has been described with particular reference to electrodes for fuel cells, it will be recognized that the alloy may also find utility in other applications wherein an electrical conductor is exposed to corosive conditions. It is to be understood that the above described embodiments are merely illustrative of the application of the principles of the invention. Numerous other arrangements may be devised by those skilled in the art without departing from the spirit and scope of the invention as defined by the appended claim.

What is claimed is:

1. In a fuel cell, the improvement and combination therewith comprising a pair of substantially identical electrodes in contact with and separated by a molten alkali carbonate electrolyte, said electrodes being in the form of thin foraminous plates of an alloy consisting essentially of about 90% by weight nickel and about 10% by weight manganese.

References Cited
UNITED STATES PATENTS

| | | | |
|---|---|---|---|
| 1,026,628 | 5/1912 | Leuchter | 204—43 |
| 1,757,714 | 5/1930 | Hogaboom | 204—293 XR |
| 2,133,291 | 10/1938 | Gordon | 75—170 XR |
| 2,913,511 | 11/1959 | Grubb | 136—86 |
| 3,150,011 | 9/1964 | Winsel et al. | 136—120 |
| 3,215,562 | 11/1965 | Hindin | 136—86 |
| 3,219,730 | 11/1965 | Bliton et al. | 136—120 XR |
| 3,235,473 | 2/1966 | Le Duc | 204—30 |
| 3,257,239 | 6/1966 | Shultz et al. | 136—86 |
| 3,288,653 | 11/1966 | Holt et al. | 136—120 |
| 3,291,753 | 12/1966 | Thompson | 136—120 XR |

ALLEN B. CURTIS, Primary Examiner

A. SKAPARS, Assistant Examiner

U.S. Cl. X. R.
136—28, 120